March 3, 1970     A. W. VOORHEES, JR     3,498,494
COMPOSITE TOTE BOX GROUP
Filed July 5, 1968     2 Sheets-Sheet 1
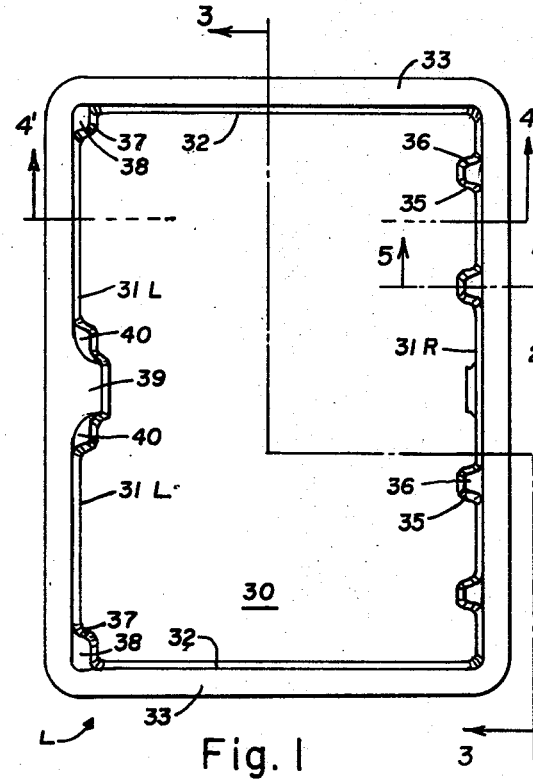
Fig. 1
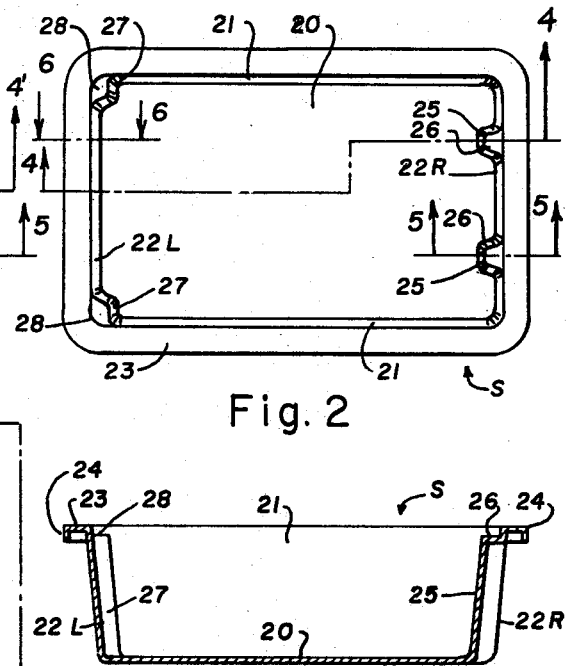
Fig. 2
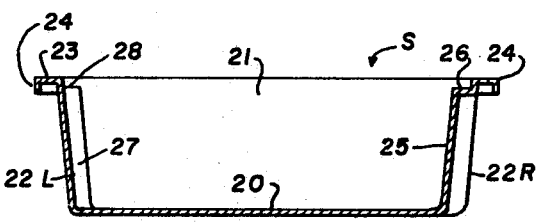
Fig. 4
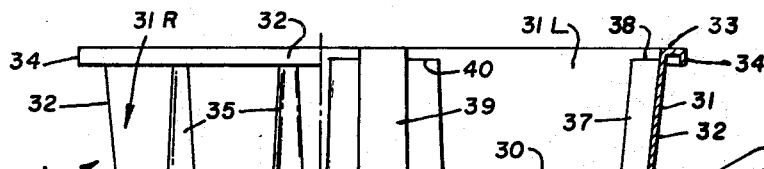
Fig. 3
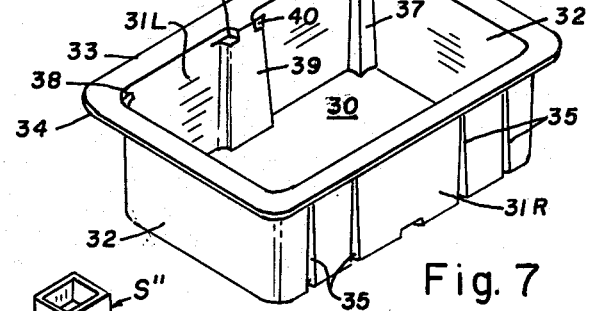
Fig. 7
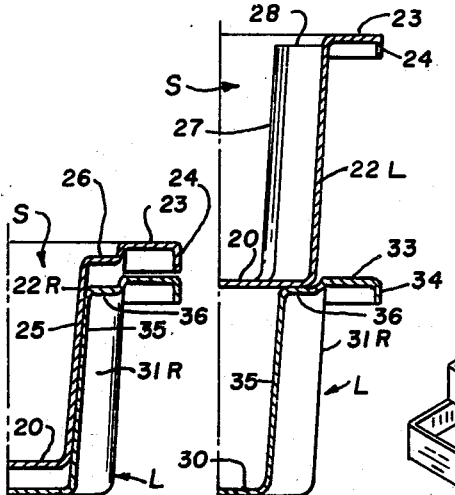
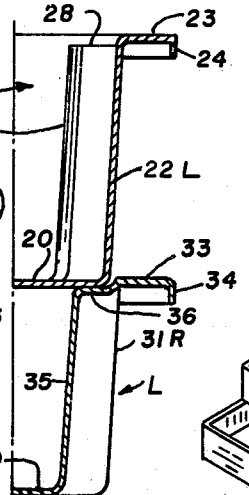
Fig. 5    Fig. 6
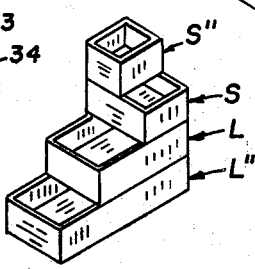
Fig. 14
INVENTOR.
Anson W. Voorhees Jr.
BY Van Valkenburgh & Fowe
ATTORNEYS March 3, 1970  A. W. VOORHEES, JR  3,498,494
COMPOSITE TOTE BOX GROUP Filed July 5, 1968  2 Sheets-Sheet 2

INVENTOR.
Anson W. Voorhees Jr.
BY Van Valkenburgh & Lowe
ATTORNEYS

United States Patent Office 3,498,494
Patented Mar. 3, 1970

3,498,494
COMPOSITE TOTE BOX GROUP
Anson W. Voorhees, Jr., Denver, Colo., assignor to Best Quality Plastics, Inc., Denver, Colo., a corporation of Colorado
Filed July 5, 1968, Ser. No. 742,811
Int. Cl. B65d 21/02
U.S. Cl. 220—97
8 Claims

ABSTRACT OF THE DISCLOSURE

A composite tote box group, including larger boxes and smaller boxes. Each box is formed of sheet material, with inclined walls and otherwise tapered components to permit nesting of corresponding boxes. The smaller has a length corresponding to the width of the larger and a width corresponding to a module of the length of the larger to permit a plurality of smaller boxes to nest in a larger box. A desirable group consists of a larger box of a size which accommodates two smaller boxes.

The boxes are arranged with stacking columns formed in opposite endwalls or sidewalls, a pair at each end of the smaller box and corresponding groups at the sides of the larger box. In the preferred arrangement, the stacking columns at one end of the smaller box are at the corners of the box, and the pair at the opposite end are spaced at intermediate positions across the end so that the boxes will nest when corresponding pairs are intermeshed and will stack when one is rotated with respect to the other. The larger box is provided with correspondingly arranged groups of stacking columns along each side wall. Accordingly, groups of larger boxes will nest and stack with each other; the smaller boxes will nest and stack with each other and also will nest and stack with the larger boxes.

---

This invention relates to containers, and more particularly to box type containers which nest together in one arrangement and which form a stack in another arrangement. These containers are used extensively in the materials handling industry and in connection with factory production lines and are commonly called "Tote Boxes." A primary object of the present invention is to provide a novel and improved arrangement of tote box containers of different sizes which can be used together in a nesting and stacking modular arrangement. Accordingly, the invention herein wall sometimes be called a "Composite Tote Box Group."

The need for the present invention arose from the desire to better accommodate assembly line workers in the electronics industries. The nest-stack tote boxes are used to provide these workers with materials and components. The worker may be given a stack of tote boxes filled with components and as he uses up the components, he will nest the empties together to conserve space until they can be returned to a supply depot. Often a worker will be required to assemble several components in an operation and this will require several stacks of boxes. Not only does this consume space on his workbench, but also the sizes of the components may vary and to maintain a balanced operation, both large and small tote boxes may be necessary. When using different sizes of tote boxes, there is a natural tendency for a workman to place the smaller tote boxes into the larger boxes and perhaps upon delicate components. Also, he is apt to pile the empty boxes together without consideration of the handling and space advantages to be gained when they can be neatly nested together.

With such need in view, the present invention was conceived and developed, and comprises, in essence, a composite tote box group of tote boxes of varying sizes which are interrelated together in a modular manner with unique, correlated nest and stack means. Thus, not only are the boxes of one size adapted to nest and stack together, but also the boxes of another size are adapted to nest and stack with the boxes of the first mentioned size, all as will be hereinafter set forth.

Accordingly, another object of the invention is to provide a novel and improved composite tote box group of smaller and larger boxes, wherein the boxes are interrelated in size in a modular manner so that a plurality of smaller boxes can be nested and stacked in a larger box.

Another object of the invention is to provide a novel and improved composite tote box group which is especially adapted to supply a worker with components of different size in suitable, different-sized containers which will permit the worker to stack a smaller container upon a larger container and not merely place it in the container, and thus avoid the risk of damaging the components in the larger container.

Another object of the invention is to provide a novel and improved composite tote box group of different sized containers which are interrelated together in a modular manner to permit stacking of one size of container with another size of container while in use and thereafter, to nest all of the empty containers together into a single, neat and compact pile.

Further objects of the invention are to provide a novel and improved composite tote box group formed of simple, neat appearing, low cost, rugged and durable component boxes.

With the foregoing and other objects in view, my invention comprises certain constructions, combinations and arrangements of parts and elements as hereinafter described, defined in the appended claims and illustrated in the accompanying drawings in which:

FIGURE 1 is a plan view of a larger container of a composite tote box group using two sizes of boxes, which is constructed according to the principles of the invention and which will nest or stack with a similar box or with one or two of the smaller containers.

FIGURE 2 is a plan view of the smaller container of the composite tote box group mentioned in the FIG. 1 description.

FIGURE 3 is a longitudinal sectional view of the tote box container shown at FIG. 1, as taken from the indicated line 3—3 at FIG. 1.

FIGURE 4 is a longitudinal sectional view of the tote box container shown at FIG. 2, as taken from the indicated line 4—4 at FIG. 2; however, this FIG. 4 may also be referred to as being a transverse sectional view as taken from the indicated broken line 4'—4' at FIG. 1.

FIG. 5 is a fragmentary sectional detail of portions of the larger tote box container shown at FIG. 1 and of the smaller tote box container shown at FIG. 2 as being nested within the larger container, the composite view being taken from the indicated lines 5—5 at FIGS. 1 and 2.

FIGURE 6 is a fragmentary sectional detail similar to the showing at FIG. 5, but illustrating the smaller tote box container as being stacked upon the larger, the composite view being taken from the indicated line 5—5 at FIG. 1 and the indicated line 6—6 at FIG. 2.

FIGURE 7 is an isometric view of the larger tote box container.

FIGURE 14 is a small scale block diagram illustrative of one manner in which four different sizes of tote boxes may be used as a composite group.

Figure 8:
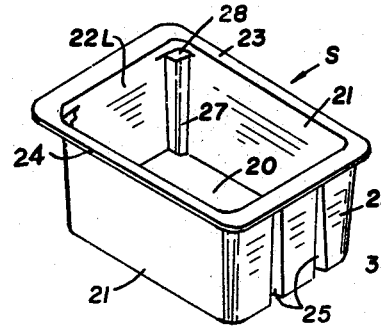
FIGURE 8 is an isometric view of the smaller tote box container.

Referring more particularly to the drawing, the composite tote box group, illustrated at FIGS. 1 to 14, consists of two box sizes, a larger tote box L and a smaller tote box S which is substantially half the size of the first. The comparative proportions are as follows: the smaller box S has the same height as the larger; its length is the same as the width of the larger box and its width is half the length of the larger box. The principles and versatile application of the invention may be readily disclosed by a description of this two-size composite tote box group. However, it is to be understood that the use of composite tote boxes is not restricted to a two-size group of boxes only, for a number of variations of arrangements are possible and FIG. 14 is included to better point this out, as will be hereinafter further described.

It is to be noted that these nest-stack tote boxes are necessarily made of formed sheet material of substantially uniform thickness. This material may be of drawn sheet metal or of drawn or molded synthetic resin plastics. The commonly used and preferred material and method of manufacture of such tote boxes involves the vacuum or pressure drawing of thermoplastic resin materials, one suitable type of material being high-impact polystyrene. According to a conventional and common practice, a sheet of polystyrene is heated to its drawing temperature and is then vacuum formed in a suitable mold. The excess sheet material is then cut away from the complete article. However, a detailed description of the material and the methods of its manufacture are not necessary to this disclosure since the same is well known to the art.

The structural arrangement of the smaller tote box S is conventional in many respects. It is formed with a rectangular bottom 20 from whence side walls 21 upstand from the longitudinal edges of the bottom and end walls 22R and 22L upstand from the transverse edges of the bottom. When formed of a drawn sheet material, the corners and edges of the walls and bottom are rounded to produce a neat-appearing unit devoid of undesirable, sharp corners. These walls slope outwardly from the bottom edge at a small angle from the vertical with respect to the bottom to provide for an effective nesting of one box S into another, such being a conventional practice. The top edges of the walls 21 and 22 are flared outwardly to provide a continuous, peripheral top rim 23 which will preferably have its outer edge downturned as a small, continuous flange 24 to enhance the rigidity of the structure. This simple, rectangular tote box S is completed by alternately oriented stack columns in each end wall thereof which will now be described.

The desirable feature and commercial utility of a tote box over a similar ordinary box-type container resides in the fact that a pair of such boxes can be nested together in one arrangement and stacked, one upon another when a box is rotated 180 degrees with respect to another from the nesting arrangement. This is accomplished by the use of stacking columns formed in each end wall of the tote box S. Each stacking column is formed as a corrugation or flute in the end wall with the base thereof projecting into the bottom of the box and with the top thereof terminating as a shelf which is preferably located a short distance below the top rim 23. Each stacking column is tapered from its base at a slope which corresponds with the outward slope of the walls 21 and 22, to provide for the nesting of a column of one box with a corresponding column of another box when the two boxes are nested together, It follows that to provide for tote boxes which nest together, the stacking columns of one tote box must register with those of another; however, in order for the tote boxes to stack, one upon the other, the stacking columns must be out of registration so that the outer edge of the bottom of the upper box will rest upon the shelf portions of the columns of the lower box. With these shelf portions below the rim 23, a socket-like arrangement is formed so that whenever one box is stacked upon another, with the edge of the bottom resting upon the shelves, the upper box will not slip out of position.

This expedient is accomplished by establishing left-hand end and right-hand end walls of the tote box, 22R and 22L and positioning the columns on one wall differently from the arrangement on the other wall. Accordingly, the columns on the right end wall 22R are intermediate wall columns 25, located at the approximate one-third points of the wall and formed as a tapered, corrugation-like inset of the wall structure with a shelf 26 at the top of the column a short distance from the top rim 23. The columns on the left end wall 22L are corner wall columns 27, located at each corner thereof, and each is formed as a tapered, flute-like inset of the wall structure with a shelf 28 at the top of the column at the same level as the opposite shelves 26. FIGS. 5 and 6, though showing other box arrangements, clearly illustrate the manner in which the boxes may nest when the boxes are oriented in a conforming registration and how they will stack when one box is oriented 180 degrees with respect to the other so that the bottom of the upper box will set upon the column shelves 26 or 28 of the lower box. It is to be noted that the location of the stacking columns of the right and left hand end walls can assume any of a number of alternating arrangements; however, the preferable arrangement will include the corner columns at that wall designated 22L in order to simplify the construction of the larger tote box L so that the larger and smaller tote boxes may be arranged to cooperate in their use as a composite tote box group.

The structural arrangement of the larger tote box L is also conventional in many respects. It is formed with a rectangular bottom 30 from whence side walls 31R and 31L upstand from the longitudinal edges of the bottom, and end walls 32 upstand from the transverse edges of the bottom. These walls also slope outwardly from the bottom edge at a small angle from the vertical to provide for nesting of one box into the other, and the top edges of the walls 31 and 32R and 32L flare outwardly as a continuous peripheral top rim 33 which has its outer edge turned downwardly as a small, reinforcing flange 34, the same as heretofore described.

This rectangular tote box L is proportioned to have its width the same as the length of the smaller tote box S and to have its length substantially twice the width of the smaller tote box S. So proportioned, the larger tote box L is adapted to nest and stack two smaller tote boxes arranged side by side and oriented transversely to the larger box L by providing a unique arrangement of stacking columns along the right and left side walls 31R and 31L. The right side wall 31R is provided with two sets of intermediate wall columns 35 located at the approximate first, second, fourth and fifth points of a sixth-point division of the wall, which places these columns at positions which register with the wall columns 25 of a pair of smaller tote boxes S whenever such boxes are nested into the larger box L, side by side, as in the manner illustrated at FIG. 9. As such, these wall columns 35 are formed the same as columns 25 and of the same height, with the top thereof forming a shelf 36.

To provide for a similar arrangement, the left side wall 31L is provided with corner wall columns 37 at each corner of this side wall which are substantially the same as the wall columns 27, formed as tapered, flute-like insets in the wall structure and topped by a shelf 38, the same as heretofore described. In addition, the left side wall 31L is provided with a centrally located double wall column 39 which is formed by an inwardly offset wall portion having its face and edges suitably tapered from the base thereof to permit a nesting action of the central column of one box with the corresponding element of the other. This wall column 39 is sufficiently wide as to provide for spaced apart shelves 40 which can support the adjacent corners of smaller boxes S stacked upon the larger box as in the manner illustrated, in part at FIG. 10, the comparatively wide spacing of the shelves 40 being necessary to accommodate the distance apart which the bottom corners of the smaller boxes S will assume when the boxes are arranged side by side with the side edges of their flanges 23 contacting each other.

Figure 10:
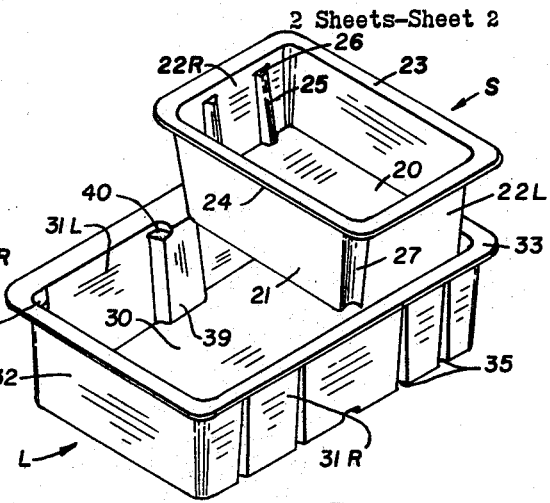
FIGURE 10 is an isometric view of the larger tote box container having one smaller tote box container stacked upon it.
Figure 9:
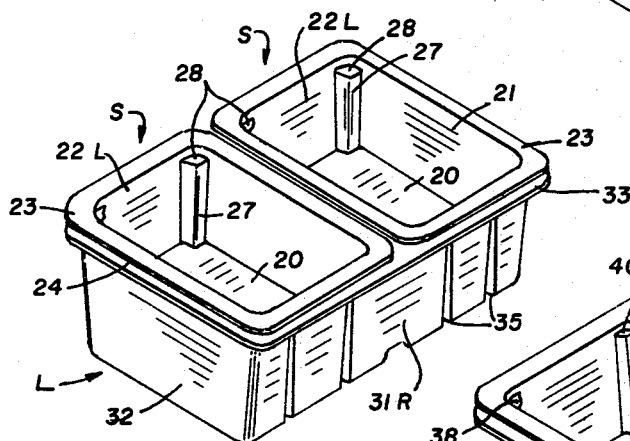
FIGURE 9 is an isometric view of the larger tote box container having two smaller tote box containers nested within it.
Figure 11:
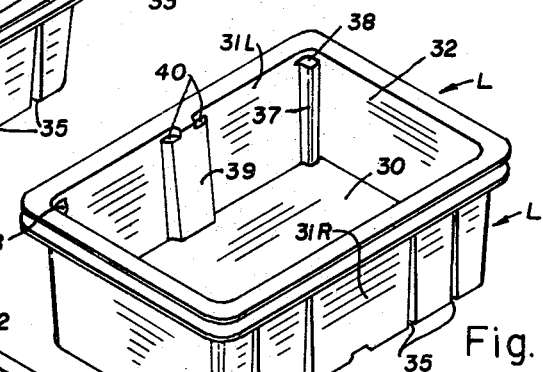
FIGURE 11 is an isometric view of a pair of the larger tote boxes nested together.
Figure 12:
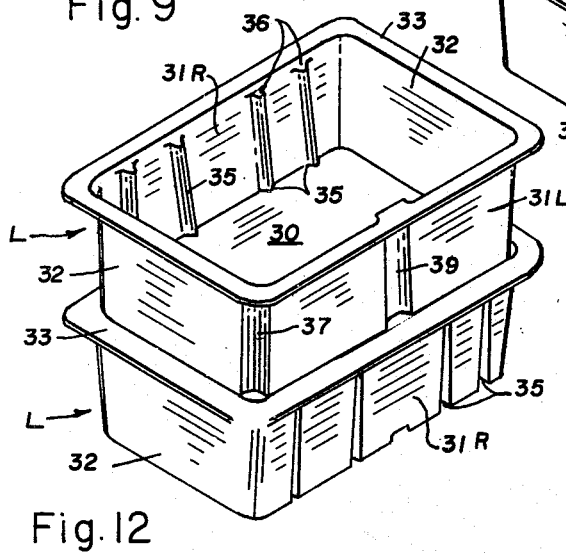
FIGURE 12 is an isometric view of a pair of the larger tote boxes stacked together.
Figure 13:
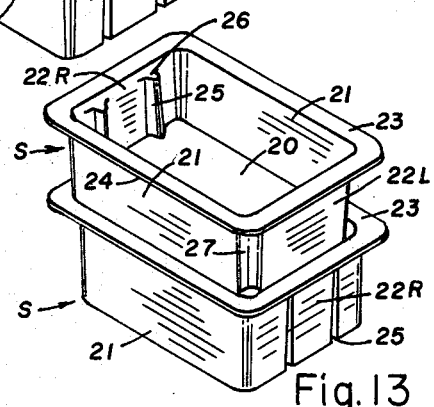
FIGURE 13 is an isometric view of a pair of the smaller tote boxes stacked together.

With the intermediate columns 35 along the right side wall 31R and the corner columns 37 and center column 39 along the left side wall 31L, of the selected arrangement described, it is manifest that two of the larger tote boxes L can be nested together as in the manner illustrated at FIG. 11, or that one may be rotated 180 degrees with respect to the other so that it may be stacked upon the first as illustrated at FIG. 12. Moreover, with the unique, correlated arrangement of intermediate columns 25 of the smaller boxes S and corresponding intermediate columns 35 of a larger box L and of the corner wall columns 27 of the boxes S, corner columns 37 and center column 39 of the larger box L, a pair of smaller tote boxes S can be nested into a larger box L, as shown at FIG. 9, or rotated 180 degrees to be stacked thereon as described. It is to be noted that the arrangement of one smaller tote box stacked upon a larger box, as illustrated at FIG. 10, is especially desirable for a factory worker where he is using different size components, for he can reach into either the larger box L or into the smaller box S stacked upon it. At the same time, the problem of placing the smaller box into the larger box or having it slip out of position and upon delicate components in the larger box is completely eliminated.

When a workman empties the boxes, he may nest them together and starting with a nested arrangement of a large and smaller boxes, as illustrated at FIG. 9, he can easily increase the pile by nesting larger boxes at the bottom of the pile and the smaller boxes at the top of the pile. Still other arrangements for using these boxes, than those illustrated and described, is possible and such will depend upon the needs and circumstances encountered by the workman.

While the foregoing description has considered only a composite tote box group wherein two box sizes are used, the present invention is not so restricted, and it will become manifest that other size groupings are possible. FIGURE 15 is a block diagram representing four boxes of different size stacked, one on top of the other. To relate these boxes to the smaller box S and the larger box L hereinabove described in detail, it is to be seen that the two intermediate sizes of the FIG. 15 group may represent the boxes S and L, with the box S being one-half the size of the box L and arranged transversely across one end of the box L, the same as shown at FIG. 10. The lowermost box L″, represented at FIG. 15, is formed with the same width as the box L, but is increased in length over the length of box L by an amount which is substantially the width of the smaller box S. The arrangement of stacking columns is substantially the same as heretofore described, except that there will be three groups of columns corresponding to the two groups of intermediate columns 35 of the box L and there will be two center double-wall columns corresponding to the column 39 of the box L. Accordingly, the lowermost, three-compartment box L″ can nest and stack three of the smaller boxes S or can stack and nest one of the larger boxes L with an end space available for access to the lower, three-compartment box L″, or this space can be used to stack or nest a smaller box S.

The uppermost box S″, represented at FIG. 15, is the smallest of the group and is one-half the size of the box S and is nested or stacked thereon transversely across one end of the box S. With this arrangement, it will be necessary to provide extra stacking columns in the sides of the box S and the relative arrangement of columns between the box S and the smaller box S″ will be substantially the same as the arrangement of columns between the boxes L and S, as heretofore described.

I have not described my invention in considerable detail. However, it is obvious that others skilled in the art can devise and build alternate and equivalent constructions which are within the spirit and scope of my invention.

I claim:

1. In a composite box group including a larger box and a smaller box, each being of a generally rectangular form, with the length of the sidewalls of the smaller being substantially equal to the width of the end walls of the larger and with the width of the end walls of the smaller being substantially equal to a module dividing the length of the sidewalls of the larger into a selected number of portions, said boxes having walls of substantially uniform thickness which are inclined outwardly from the bottom thereof sufficiently to permit nesting of one box into another, with the smaller box being adapted to nest into the larger when oriented transversely to the larger, and with the larger box being adapted to receive a selected number of smaller boxes in side-by-side, nested relationship, the improvement, wherein the larger box is provided with stacking columns arranged along the inner face of each side wall as a repeating pattern within each module portion of each sidewall, with the stacking columns at one side wall being at a spacing differing from the spacing at the opposite sidewall, and wherein the smaller box is provided with stacking sockets at the outerface of each end wall, in a pattern corresponding with the spacings of a modular portion of the aforesaid stacking columns, when the smaller box is at a first, transverse position with respect to the larger box to permit it to nest within the larger box as aforesaid, but to be stacked upon the columns of the larger box when the smaller box is rotated 180 degrees from the said first position.

2. In the tote box group defined in claim 1, including a second, smaller box, and wherein the column sockets on the outer face of the end walls of each smaller box forms stacking columns at the end walls within the boxes, with the differing spacings at each end wall fitting the stacking columns of the larger box and also permitting the two smaller boxes to be nested together when the stacking columns of one box are oriented to mesh with corresponding stacking sockets of the other box and permitting the boxes to be stacked, one on the other, when one is rotated 180 degrees from its nesting position with respect to the other.

3. In the tote box group defined in claim 1, including a second, larger box, and wherein the stacking columns on the inner face of the side walls of one larger box forms stacking sockets at the outer face of the sidewalls of the box whereby to permit the two larger boxes to be nested together when the stacking sockets of the one box are oriented to mesh with the corresponding stacking columns of the other box and permit the boxes to be stacked one on the other when one is rotated 180 degrees from its nesting position with respect to the other.

4. In the tote box group defined in claim 1, wherein the stacking column arrangement at each end of the smaller box and each modular stacking column group at each side of the larger box, include a pair of stacking columns.

5. In the tote box group defined in claim 4, wherein the two stacking columns at each end of the smaller box are spaced apart and are arranged in symmetrical positions with respect to the longitudinal center axis of the box, and wherein the spacing between the pair at one end differs from that of the other.

6. In the tote box group defined in claim 4, wherein the two stacking columns at one end of the smaller box are positioned at the corners of the box, and wherein the corresponding stacking columns of the modular groups of the larger box include a stacking column at each corner of the box and a double stacking column at the modular points of intersection which correspond and mesh with the adjacent corner stacking sockets of two smaller boxes nested side-by-side within the larger box.

7. In the tote box group set forth in claim 6, wherein the larger box has a length substantially twice the width of the smaller, and is adapted to nest and stack two smaller boxes.

8. In the tote box group set forth in claim 6, wherein each box is formed with a peripheral top rim and each said double stacking column is provided with a central portion to space a pair of nesting, smaller boxes apart sufficiently to permit the edges of the rims to be abutted with each other.

References Cited

UNITED STATES PATENTS

| | | | |
|---|---|---|---|
| 3,013,692 | 12/1961 | Chesley | 220—97 |
| 3,117,692 | 1/1964 | Carpenter | 220—23.6 X |
| 3,391,816 | 7/1968 | Swett | 220—17 X |

FOREIGN PATENTS 1,051,390   12/1966   Great Britain.

GEORGE E. LOWRANCE, Primary Examiner

U.S. Cl. X.R.

211—126; 220—17